United States Patent [19]
Lu et al.

[11] Patent Number: 5,636,107
[45] Date of Patent: Jun. 3, 1997

[54] DC-DC CONVERTERS

[75] Inventors: Qun Lu, Lexington; Fei Ma, Malden; James J. Zeng, Brookline, all of Mass.

[73] Assignee: International Power Devices, Inc., Boston, Mass.

[21] Appl. No.: 558,175

[22] Filed: Nov. 15, 1995

[51] Int. Cl.$^6$ .................................................. H02M 3/335
[52] U.S. Cl. .............................................. 363/20; 363/16
[58] Field of Search .............................. 363/16, 20, 21, 363/97, 131

[56] References Cited

U.S. PATENT DOCUMENTS

| | | | |
|---|---|---|---|
| 4,017,784 | 4/1977 | Simmons et al. | 363/17 |
| 4,441,146 | 4/1984 | Vinciarelli | 363/20 |
| 4,618,919 | 10/1986 | Martin, Jr. | 363/21 |
| 4,734,839 | 3/1988 | Barthold | 363/16 |
| 4,809,148 | 2/1989 | Barn | 363/20 |
| 4,899,271 | 2/1990 | Seiersen | 363/126 |
| 4,959,764 | 9/1990 | Bassett | 363/16 |
| 5,111,372 | 5/1992 | Kameyama et al. | 363/20 |
| 5,173,846 | 12/1992 | Smith | 363/20 |
| 5,291,382 | 3/1994 | Cohen | 363/16 |
| 5,303,136 | 4/1994 | Rozman | 363/21 |
| 5,541,828 | 7/1996 | Rozman | 363/21 |

*Primary Examiner*—Matthew V. Nguyen
*Attorney, Agent, or Firm*—Fish & Richardson P.C.

[57] ABSTRACT

A DC—DC converter including a transformer having a primary winding and a tapped secondary winding; an output filter made up of a filter inductor and a filter capacitor connected in series with one side of the output filter connected to the tap terminal of the secondary winding; a first unidirectional device and a second unidirectional device connected in series with each other and with opposite polarities, there being a common node between them, the first unidirectional device electrically coupled to the first terminal of the secondary winding, the second unidirectional device electrically coupled to the second terminal of the secondary winding, and the output filter electrically coupled to the common node; a first switch connected in series with the primary winding; and a clamping circuit connected between two of the terminals of the secondary winding, wherein the clamping circuit includes a clamping capacitor connected in series with a second switch.

18 Claims, 5 Drawing Sheets

5,636,107

DC-DC CONVERTERS

BACKGROUND OF THE INVENTION

The invention relates generally to DC—DC converters, and in particular to DC—DC converters which provide high power density.

A DC—DC converter is a device which converts a DC voltage at one level to a DC voltage at another level. The converter typically includes a transformer, having primary and secondary windings wound around a common magnetic core. By opening and closing the primary circuit for appropriate intervals, control over the energy transfer between primary and secondary is accomplished.

Common DC—DC converter topologies include the forward converter and the flyback converter. When the primary winding of the forward converter is energized by closing the primary circuit, energy is immediately transferred to the secondary winding. Energy is accumulated in the transformer of the flyback converter by closing the primary circuit and then released from the secondary winding by opening the primary circuit.

Recently, in the field of DC—DC converters, greater attention has been directed toward compactness, energy efficiency, and higher performance. One prior art method for improving power density of a DC—DC converter is to increase the switching frequency. This results in a reduction of the size of the isolation transformer and the output filter. However, the power dissipation losses during switching events become more significant as the switching frequency increases because the duration of each switching even comprises a larger fraction of each switching cycle duration as the switching frequency increases. To reduce or eliminate switching losses, zero voltage switching techniques have been proposed as described in U.S. Pat. No. 4,959,764 issued to John Bassett for "DC/DC Converter Switching At Zero Voltage" and in U.S. Pat. No. 5,173,846 issued to David Smith for "Zero Voltage Switching Power Converter".

Another prior art method for improving power density of a DC—DC converter is to combine various DC—DC converter topologies to increase the amount of power transferred through the converter and reduce the size of the output filter. Examples of such method can be found in U.S. Pat. No. 4,618,919 issued to Hubert Martin, Jr. for "Topology For Miniature Power Supply With Low Voltage And Low Ripple Requirements" and in U.S. Pat. No. 4,734,839 issued to Fred Barthold for "Source Volt-Ampere/Load Volt-Ampere Differential Converter"

Finally, in U.S. Pat. No. 5,291,382, Isaac Cohen introduces a topology which offers zero voltage switching capability and reduces the size of output filter. However, a MOSFET implementation of the switches of this topology would require the use of a high side driver.

SUMMARY OF THE INVENTION

In general, in one aspect, the invention is a DC—DC converter including a transformer having a primary winding and a center-tapped secondary winding; an output filter made up of a filter inductor and a filter capacitor connected in series with one side of the output filter connected to the center-tap terminal of the secondary winding; a first unidirectional device and a second unidirectional device connected in series with each other and with opposite polarities, there being a common node between them, the first unidirectional device electrically coupled to the first terminal of the secondary winding, the second unidirectional device electrically coupled to the second terminal of the secondary winding, and the output filter electrically coupled to the common node; a first switch connected in series with the primary winding; and a clamping circuit connected between two of the terminals of the secondary winding, wherein the clamping circuit includes a clamping capacitor connected in series with a second switch.

Preferred embodiments include the following features. The DC—DC converter also includes a control circuit controlling the operation of the first switch and second switches, causing them to work out-of-phase with each other and with a small delay during which both the first and second switches are in an off state. The first switch and the second switch are both n-channel MOSFET power transistors and the second switch is driven directly by a voltage obtained from the secondary winding of the transformer. The first and second unidirectional devices are diodes or are implemented by MOSFETS. If implemented by MOSFETS, they are each driven by voltages obtained directly from different terminals of the secondary winding.

The present invention utilizes a topology which combines a conventional forward converter and a modified flyback converter with a filter inductor and a switched capacitor to achieve a continuous delivery of energy to the output filter.

The present invention includes a DC power source; a transformer having a primary winding and a center-tapped secondary winding; a first switch which is connected in series with said primary winding, this series circuit being connected to the terminals of said DC power source: a second switch; a capacitor which is connected in series with said second switch, this series circuit being connected in parallel with the lower portion of the secondary winding; a rectifying and smoothing circuit for rectifying and smoothing a voltage generated in the secondary winding; and a switch control circuit which operates the first switch counter to the second switch with a possible small delay to achieve zero voltage switching.

The present invention achieves continuous delivery of energy; it imposes low voltage stresses on switches and rectifiers; it makes possible zero voltage switching; and it permits a significant reduction of the size of the output filter.

Other advantages and features will become apparent from the following description of the preferred embodiment and from the claims.

DESCRIPTION OF THE PREFERRED EMBODIMENTS

To appreciate the invention, it is useful to first review the details of the two conventional converter topologies, namely, the forward converter and the flyback converter.

Figure 1:
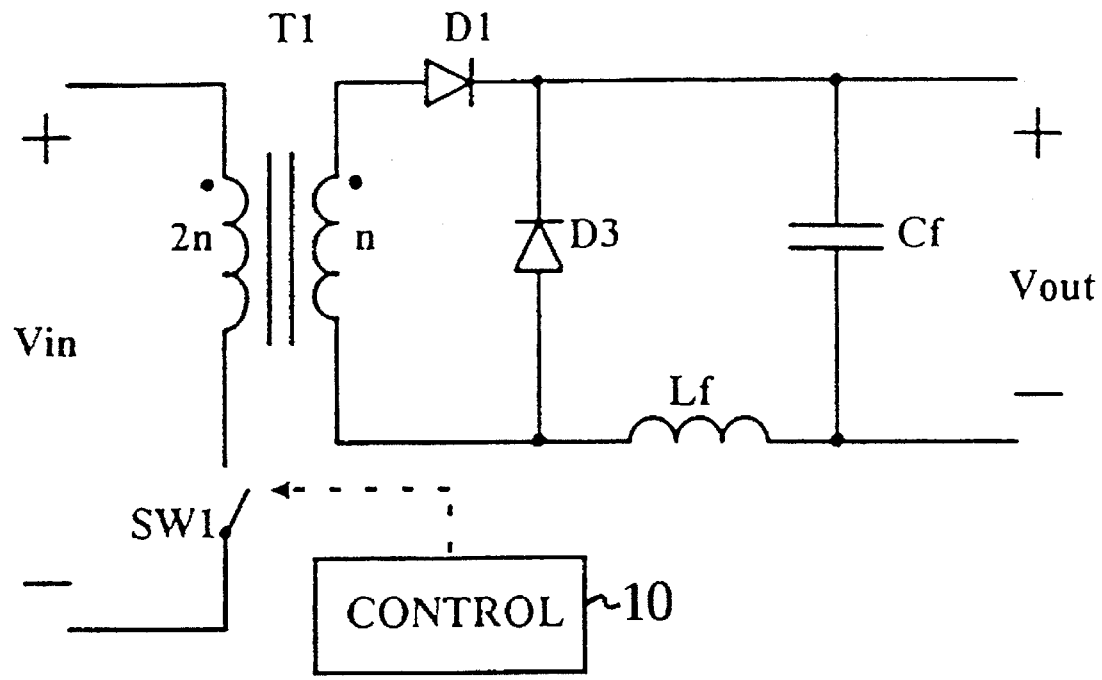
FIG. 1 is a conventional forward converter with transformer turns ratio 2:1.

A conventional forward converter is shown in FIG. 1. It includes a transformer T1 with a switch SW1 in series with one side of the primary winding and a diode D1 in series with one side of the secondary winding and a series combination of a filter capacitor Cf and a filter inductor Lf. The load (not shown) is connected across filter capacitor Cf. A controller unit 10 controls the operation of switch SW1. In this example, as will be the case for other examples in this description, we assume that the transformer has a turns ratio of 2:1.

When switch SW1 is closed, energy is transferred directly through the transformer into the filter section and the load. When switch SW1 is opened, the forward energy transfer stops and a freewheeling diode D3, which is connected in parallel with the filter section, allows the energy stored in filter inductor Lf to release into filter capacitor Cf during the off cycle. The transfer function of this forward converter is given by:

$$V_{out} = \frac{V_{in} t_{on}}{2(t_{on} + t_{off})} = \frac{V_{in} D}{2} \tag{1}$$

where D is the duty cycle and equals:

$$D = \frac{t_{on}}{(t_{on} + t_{off})} \tag{2}$$

Figure 2:
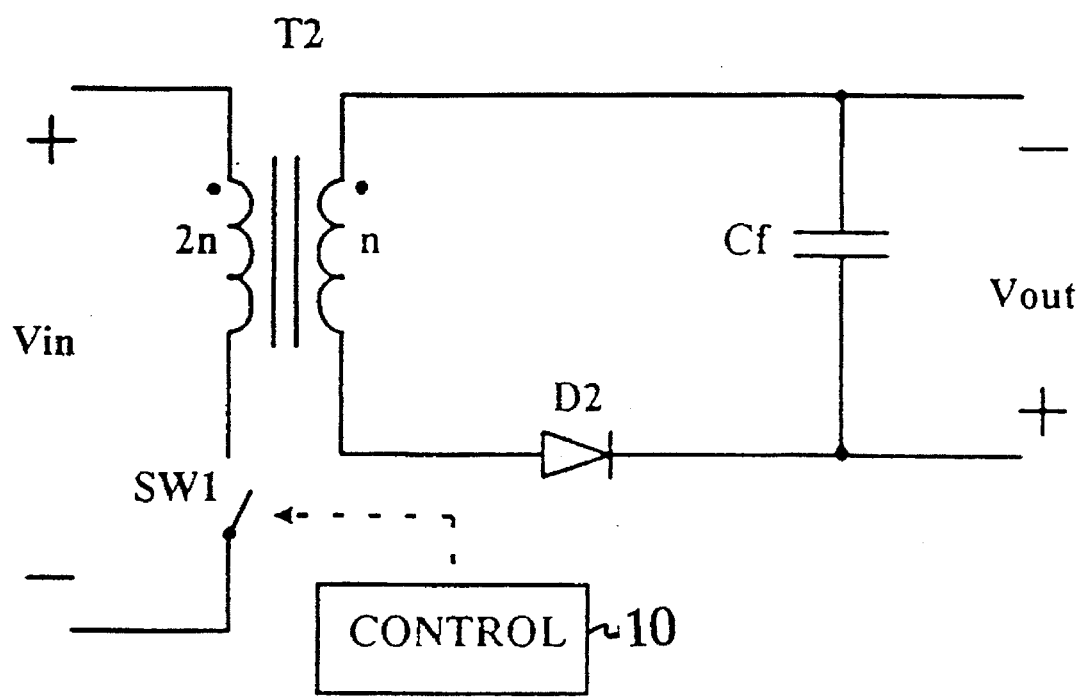
FIG. 2 is a conventional flyback converter with transformer turns ration 2:1.

A conventional flyback converter is shown in FIG. 2. Again a switch SW1 in series with the primary of transformer T1 controls the energy transfer through transformer T2 into filter capacitor Cf and a load (not shown). In this case, however, a diode D2, which is in series with the secondary but having an opposite polarity from diode D1 in the case of the forward converter, prevents forward energy transfer to the load when switch SW1 is closed. Instead, transformer T2 stores energy during the period when switch SW1 is closed, which is subsequently released into the filter capacitor and the load during a flyback period of operation when switch SW1 is opened.

The transfer function of this flyback converter is given by:

$$V_{out} = \frac{V_{in} t_{on}}{2 t_{off}} = \frac{V_{in} D}{2(1-D)} \tag{3}$$

Figure 3:
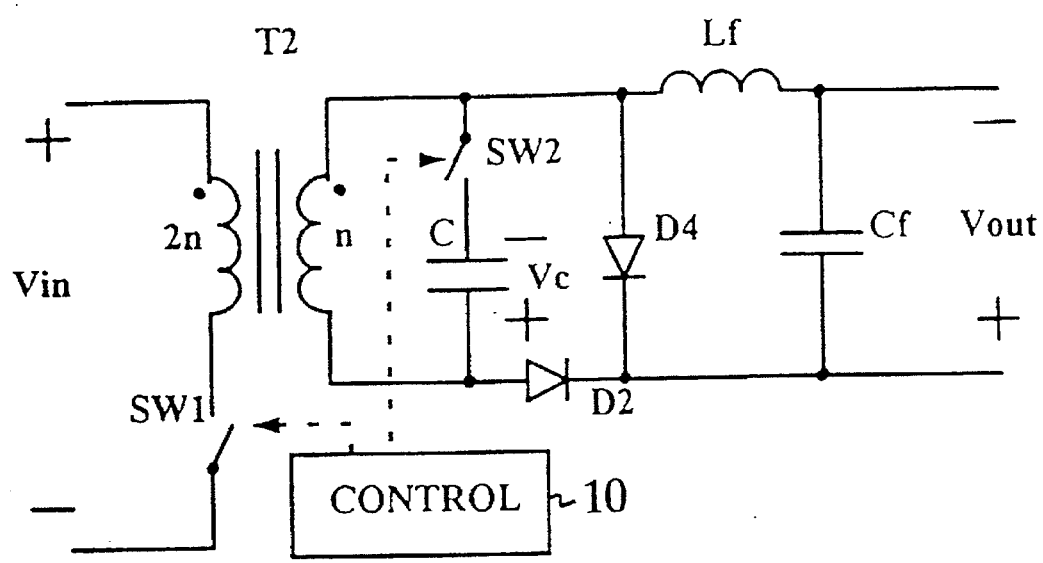
FIG. 3 is a modified flyback converter.

A modified flyback converter is shown in FIG. 3. As can be seen by comparing it with the flyback converter of FIG. 2, a filter inductor Lf has been added between the secondary winding of transformer T2 and filter capacitor Cf to provide additional smoothing. In addition, a capacitor C connected in series with a switch SW2 has been added across the secondary winding and a freewheeling diode D4 has been added across the filter section. The switches SW1 and SW2 are operated in opposite phase to each other, i.e., when switch SW1 is closed, switch SW2 is opened and vice versa. During the flyback period, i.e., when switch SW1 is opened, the voltage across capacitor C clamps the flyback voltage of transformer T2. Diode D4 serves the same function as the previously described freewheeling diode shown in FIG. 1.

In the circuit of FIG. 3, when switch SW1 turns on and switch SW2 turns off, energy begins to accumulate in transformer T2. During this period, filter inductor Lf, through freewheeling diode D4, and filter capacitor Cf provide energy to the output load. After switch SW1 turns off and switch SW2 turns on, the energy stored in transformer T2 begins to release from the secondary winding to filter inductor Lf, filter capacitor Cf, and the output load. A portion of the energy is also transferred to capacitor C at first and then released from it during this period.

In all of these examples, capacitor C is assumed to be large enough so that the time dependence of the voltage across it can be approximately neglected. Under steady state conditions, the volt-second product impressed on the magnetizing inductor of transformer T2 during the on time of switch SW1 must equal the volt-second product during the off time. Thus, it follows that:

$$\frac{V_{in} t_{on}}{2} = V_c t_{off} \tag{4}$$

or $$V_c = \frac{V_{in} t_{on}}{2 t_{off}} = \frac{V_{in} D}{2(1-D)} \tag{5}$$

Also, the volt-second product impressed on filter inductor Lf during the on time of switch SW1 must equal the volt-second product during the off time. Thus, it follows that:

$$V_{out} t_{on} = (V_c - V_{out}) t_{off} \tag{6}$$

or $$V_{out} = \frac{V_c t_{off}}{t_{on} + t_{off}} = V_c (1-D) \tag{7}$$

By substituting Eq. (5) into Eq. (7), we get the transfer function of this modified flyback converter as follows:

$$V_{out} = \frac{V_{in} D}{2} \tag{8}$$

This transfer function is the same as that of the conventional forward converter discussed above.

Figure 4:
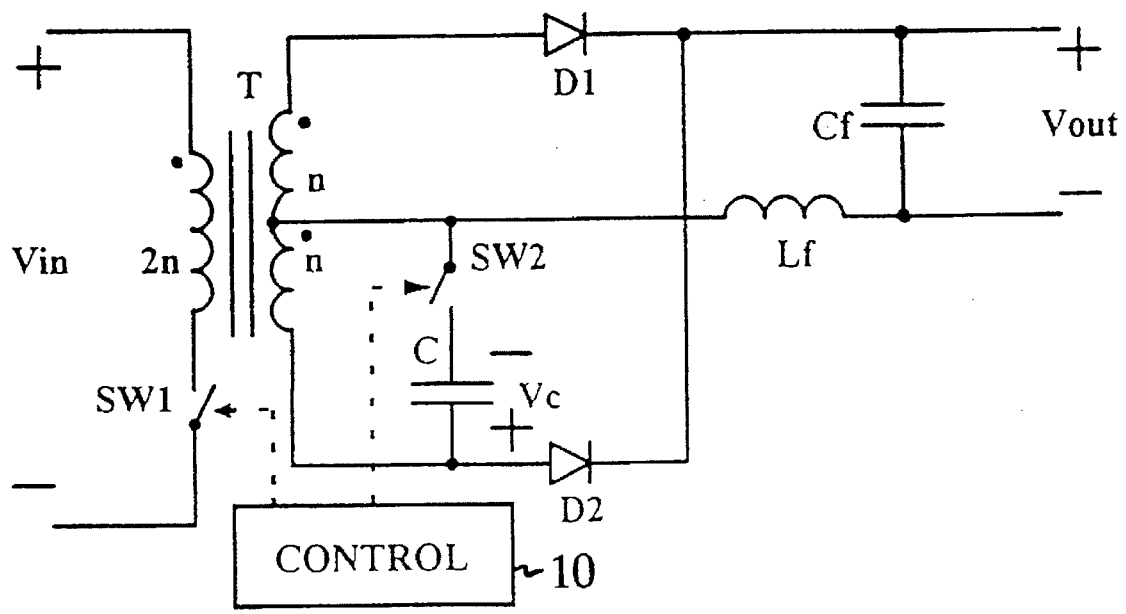
FIG. 4 shows a converter which combines the conventional forward converter of FIG. 1 and the modified flyback converter of FIG. 3.

An embodiment of a converter constructed in accordance with another aspect of the invention is shown in FIG. 4. This embodiment combines the conventional forward converter of FIG. 1 and the modified flyback converter of FIG. 3. By comparing it with those of FIG. 1 and FIG. 3, we can see that the new topology is constructed by connecting the two secondary windings of transformer T1 of FIG. 1 and transformer T2 of FIG. 3 in series to form the center-tapped secondary winding of transformer T and then by connecting these two portions in parallel through rectifying diodes D1 and D2 so as to share a common output filter. We can also see that freewheeling diodes D3 and D4 (refer to FIGS. 1 and 3) are eliminated because the center-tapped secondary winding provides the necessary freewheeling path.

Figure 5A:
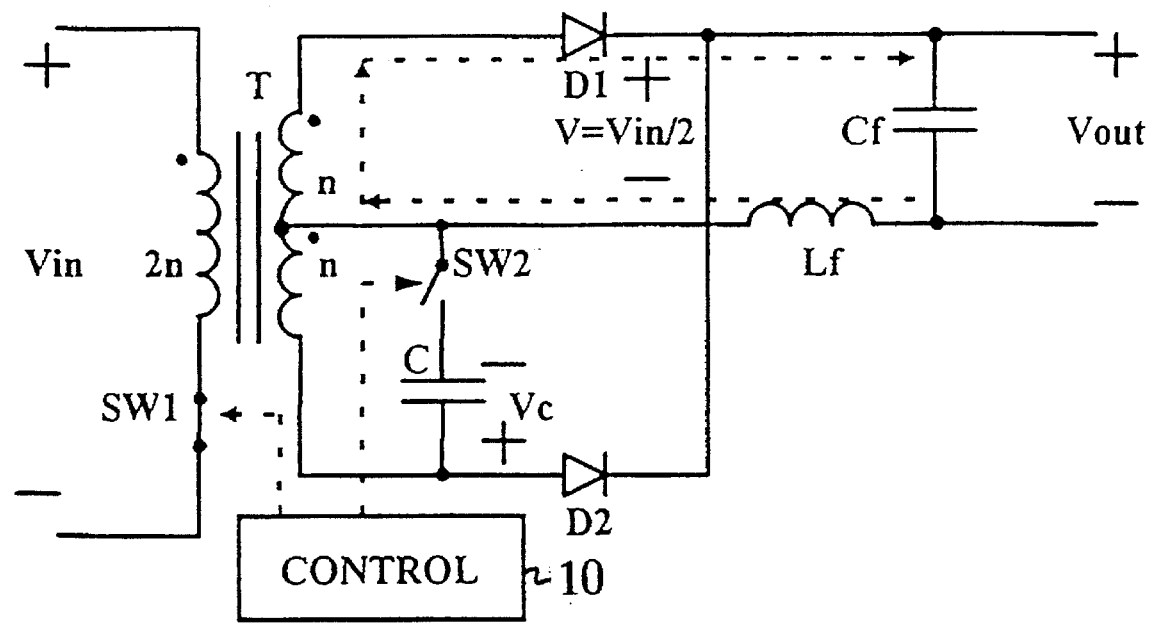
FIGS. 5a–5b illustrate the converter of FIG. 4 during the forward period operation and the flyback period operation.

When switch SW1 turns on and switch SW2 turns off, starting the forward period, the voltage across the upper portion of the secondary winding (V=Vin/2) is impressed on the output filter, as shown in FIG. 5a, and a current created by this voltage begins to flow. In other words, during this period, energy is immediately transferred from the DC power source to the output filter. This portion of the secondary winding also provides the freewheeling path for the existing current in filter inductor Lf.

Figure 5B:
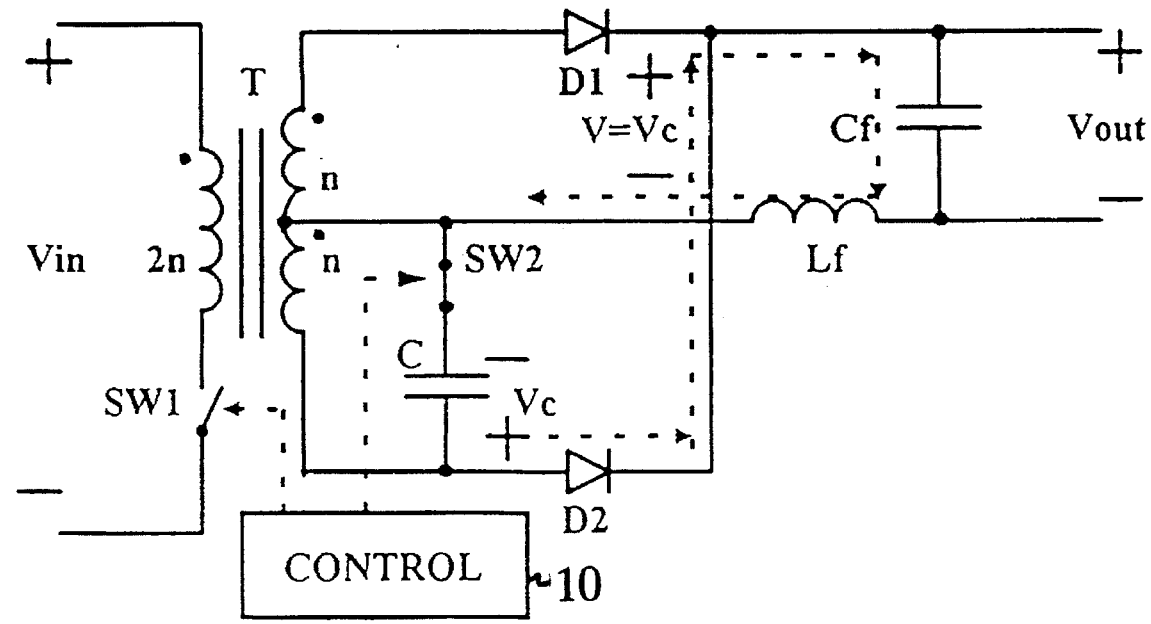

When switch SW1 turns off and switch SW2 turns on, starting the flyback period, the voltage across the lower portion of the secondary winding (V=Vc) is impressed on the output filter as shown in FIG. 5b, and a current created by this voltage begins to flow. During this period, the energy that was accumulated in transformer T during the forward period is now released. This portion of the secondary winding also provides the freewheeling path for the existing current in filter inductor Lf.

Therefore, two separable processes, i.e., the forward process and the flyback process, exist simultaneously during the operation of this converter. Based on superposition theorem, it is easy to see that the output voltage of this converter is simply the summation of the output voltages of the conventional forward converter of FIG. 1 and the modified flyback converter of FIG. 3. According to equations (1) and (8), the transfer function of this converter is given by:

$$V_{out} = \frac{V_{in}D}{2} + \frac{V_{in}D}{2} = V_{in}D \qquad (9)$$

This transfer function is the same as that of a conventional forward converter with transformer turns ratio 1:1.

We can see that this converter achieves a continuous delivery of energy. Energy is transferred to the output filter during both the forward period and the flyback period. Since transformer T is used to store energy as well as to transfer energy, a gap in the magnetic path of transformer T needs to be present in order to support the DC flux.

The voltage impressed on the output filter of this converter during the forward period and the flyback period are $V_{in}/2$ and $V_{in}D/(2(1-D))$, respectively. Thus, the peak-to-peak ripple voltage across the output filter is given by:

$$V_{p!p} = \frac{V_{in}}{2} - \frac{V_{in}D}{2(1-D)} \qquad (10)$$

$$V_{p!p} = \frac{V_{in}(1-2D)}{2(1-D)} \qquad (11)$$

The peak-to-peak ripple voltage is a function of the duty cycle and it equals zero when D=50%. For an input voltage range of 2:1 and a maximum duty cycle of 70%, the maximum $V_{p!p}$ will occur at minimum input voltage and equal $0.6667\ V_{inmin}$. or $0.3333\ V_{inmin}$.

In contrast, for a conventional forward converter with transformer returns ratio 1:1 and for the same input voltage range and maximum duty cycle, the maximum peak-to-peak ripple voltage across its output filter equals $V_{inmin}$. This means that the size of the output filter of the converter of the present invention can be significantly smaller than that of a conventional forward converter.

The voltage stresses on switches SW1 and SW2 of this converter are $V_{in}/(1-D)$ and $V_{in}/(2(1-D))$, respectively. While the voltage stresses on rectifiers D1 and D2 are $V_{in}D/(1-D)$ and $V_{in}$, respectively. We can see that the voltage stresses on these devices, especially on switch SW2, are low.

It is also possible for this converter to utilize the magnetizing current in transformer T to discharge the output capacitance of switches SW1 and SW2 to zero prior to the closing of these devices, if the switch control circuit operates these switches out-of-phase with respect to each other and with a small delay during which both switches are open.

Figure 7:
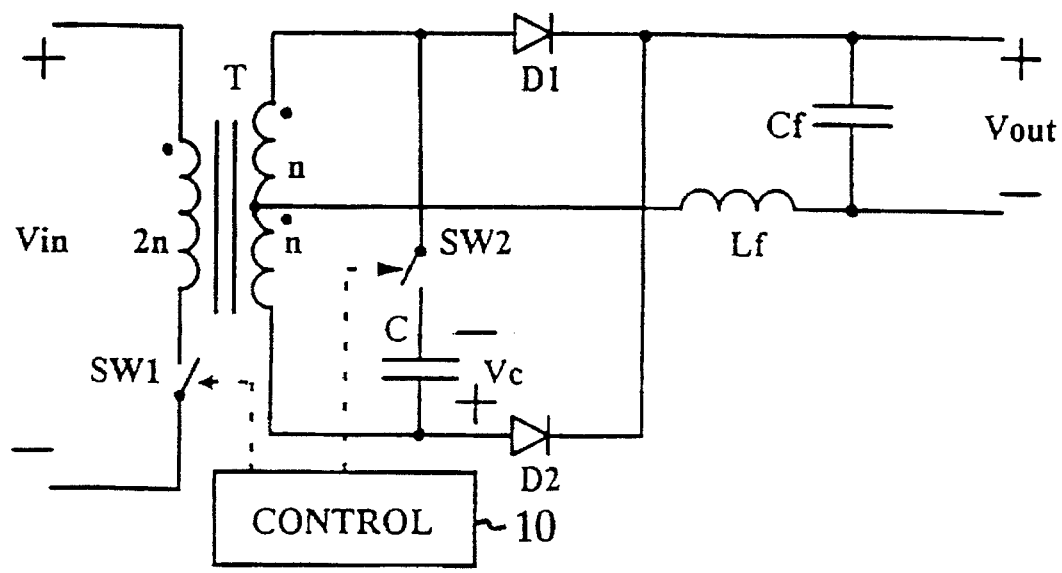
FIG. 7 is an alternative embodiment of the converter of FIG. 4.

FIG. 7 illustrates a modified implementation of the converter of FIG. 4 in which zero voltage switching is not a major concern. Note that in this circuit, the diodes D1 and D2 are reversed and their common terminals are connected to the filter inductor Lf. Thus, the output voltage that is produced across the filter capacitor Cf is of opposite polarity to that which is produced in the embodiment of FIG. 4. Also in this example, switches SW1 and SW2 are implemented with two MOSFET power transistors. Switch SW1 is an n-channel MOSFET power transistor with its drain and source terminals connected to the primary winding of transformer T and the negative input terminal (i.e., ground), respectively. Switch SW1 is controlled by applying an external drive signal to the gate terminal of the MOSFET power transistor. The drive signal is generated by an external control circuit and is conveniently referenced to ground.

Switch SW2 is also an n-channel MOSFET power transistor. In this case, its drain and source terminals are connected to the clamping capacitor C and the center-tap of the secondary winding of transformer T, respectively. Control of switch SW2 is simply accomplished by connecting its gate terminal to a terminal of the secondary winding of transformer T.

Figure 8:
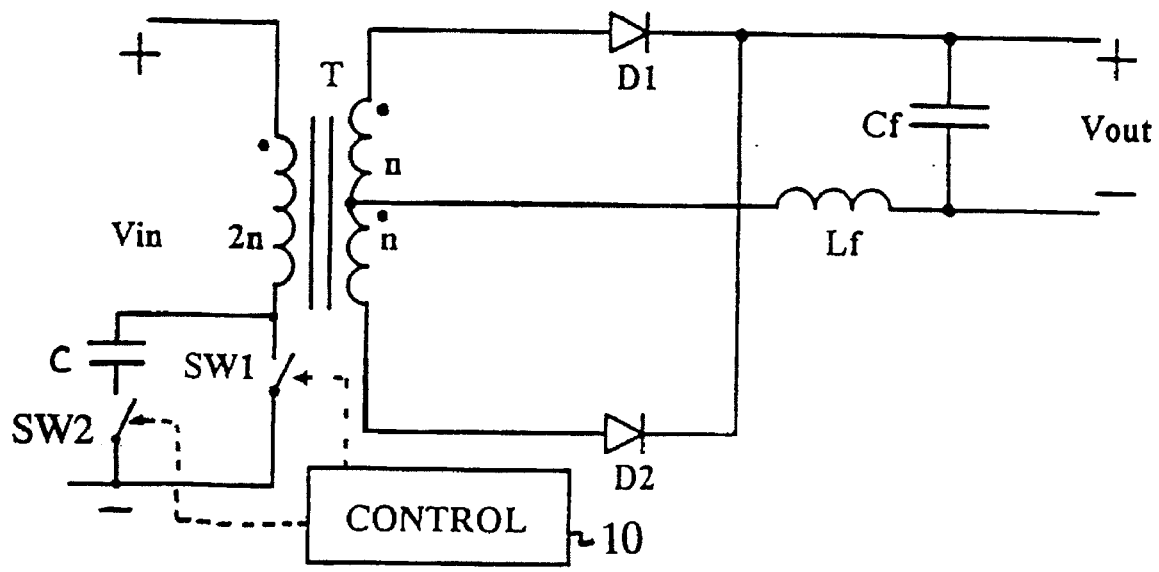
FIG. 8 is another alternative embodiment of the converter of FIG. 4.

The circuit of FIG. 8 is the same as the circuit of FIG. 7 except that rectifiers D1 and D2 are self-driven rectifiers implemented with two MOSFET power transistors. More specifically, the drive for the gate terminal of each MOSFET is taken from the secondary winding terminal to which the drain of the other MOSFET is connected.

Figure 6A:
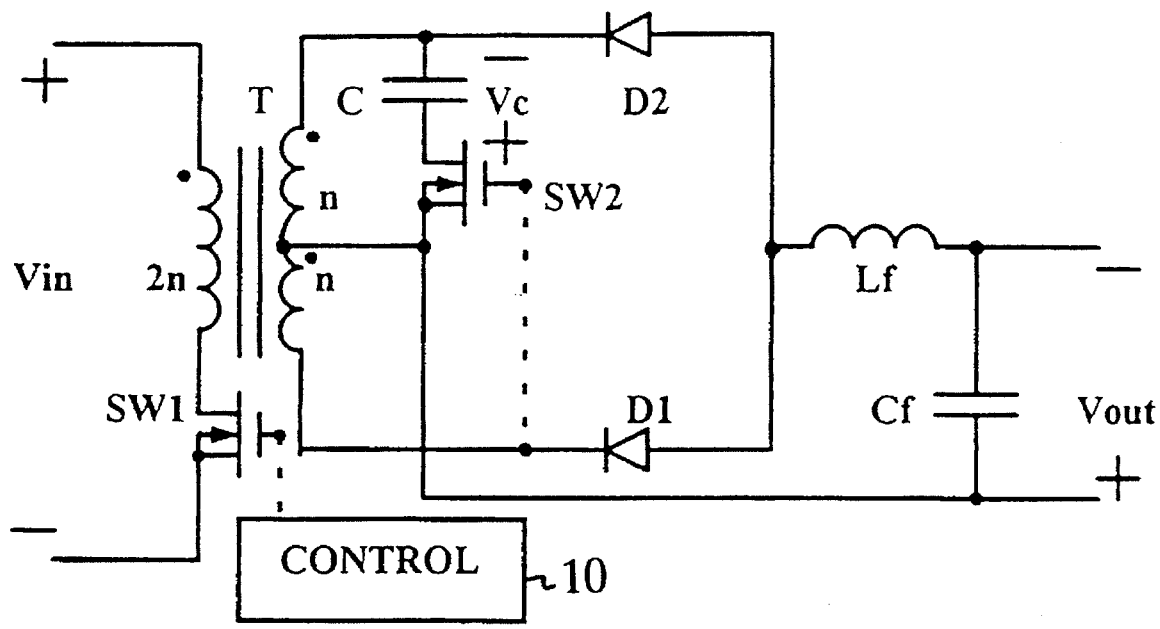
FIGS. 6a–6b are alternative embodiments of the converter with the clamping circuit placed at different locations from that shown in FIG. 4
Figure 6B:
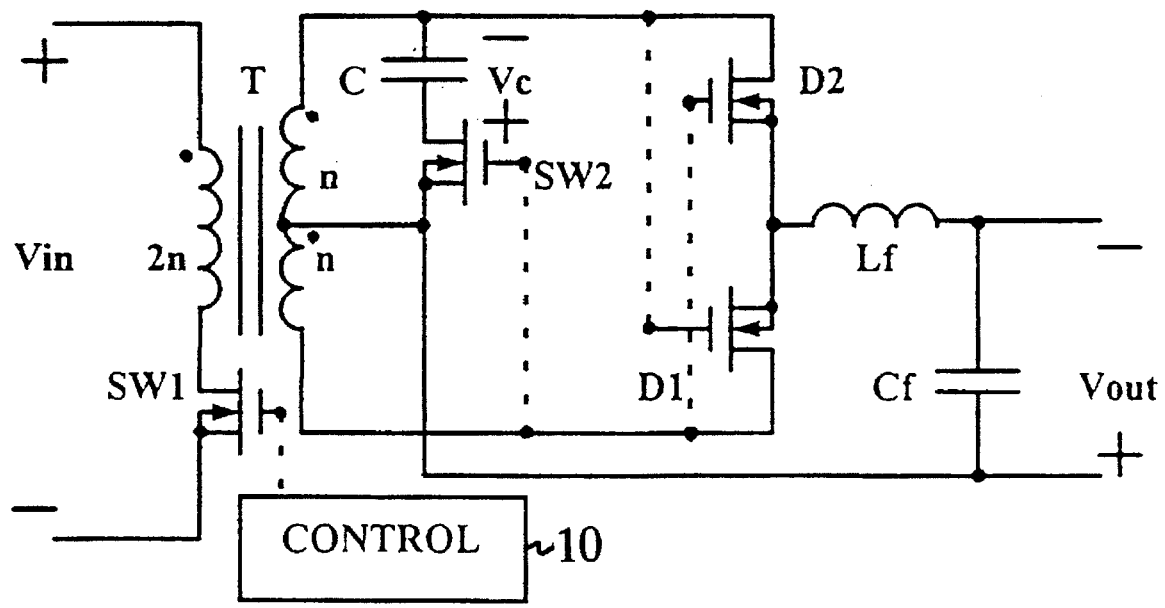

It should be noted that the clamping circuit including switch SW2 and capacitor C, can be placed at other locations in the converter to achieve substantially similar results and with similar benefits. For example, it can be connected between the outer terminals of the secondary winding, as shown in FIG. 6a, or it can be connected across the other half of the secondary (i.e., the forward converter side), as shown in FIG. 6b.

Other embodiments are within the following claims.

What is claimed is:

1. A DC—DC converter comprising:
   a transformer having a primary winding and a tapped secondary winding, wherein said tapped secondary winding has a first terminal, a second terminal, and a tap terminal;
   an output filter comprising a filter inductor and a filter capacitor connected in series, wherein one side of said output filter is connected to the tap terminal of the secondary winding;
   a first unidirectional device and a second unidirectional device connected in series with each other and with opposite polarities, there being a common node between them, said first unidirectional device electrically coupled to the first terminal of the secondary winding, said second unidirectional device electrically coupled to the second terminal of the secondary winding, and said output filter electrically coupled to the common node;
   a first switch connected in series with the primary winding; and
   a clamping circuit connected between two of the first, second, and tap terminals of the secondary winding, said clamping circuit comprising a clamping capacitor and a second switch connected in series.

2. The DC—DC converter of claim 1 wherein the transformer has a center-tapped secondary and wherein the tap terminal is a center-tap terminal.

3. The DC—DC converter of claim 2 further comprising:
   a control circuit controlling the operation of the first switch.

4. The DC—DC converter of claim 3 wherein the control circuit controls the operation of both the first and second switches.

5. The DC—DC converter of claim 4 wherein the control circuit controls the operation of the first and second switches so that the first and second switches operate out-of-phase with each other.

6. The DC—DC converter of claim 5 wherein the control circuit controls the operation of the first and second switches so that the first and second switches operate out-of-phase with each other and with a small delay in which both the first and second switches are in an off state.

7. The DC—DC converter of claim 5 wherein said secondary has an upper section and a lower section, wherein the first terminal connects to the upper section and the second terminal connects to the lower section, wherein said first switch when closed causes energy from a DC power source to be coupled through the upper section of the secondary winding to an output load, and wherein said first switch when opened causes energy stored in the transformer to be released through the lower section of the secondary winding to the output load.

8. The DC—DC converter of claim 5 wherein said secondary has an upper section and a lower section, wherein the first terminal connects to the upper section and the second terminal connects to the lower section, and wherein both the upper and lower sections have a turns ratio with respect to the primary of n:m, where n and m are positive numbers.

9. The DC—DC converter of claim 8 wherein n=2m.

10. The DC—DC converter of claim 3 wherein said first switch and said second switch are both n-channel MOSFET transistors and wherein said second switch is driven directly by a voltage obtained from the secondary winding of the transformer.

11. The DC—DC converter of claim 2 wherein the first and second unidirectional devices are diodes.

12. The DC—DC converter of claim 2 wherein the first and second unidirectional devices are implemented by MOSFETS.

13. The DC—DC converter of claim 12 wherein the first and second unidirectional devices are each driven by voltages obtained directly from different terminals of the secondary winding.

14. The DC—DC converter of claim 2 wherein the clamp circuit is connected between the first and second terminals of the secondary winding.

15. The DC—DC converter of claim 2 wherein the clamp circuit is connected between on of the first and second terminals and the center tap terminal.

16. The DC—DC converter of claim 7 wherein the clamp circuit is connected across the upper section of the secondary winding.

17. The DC—DC converter of claim 7 wherein the clamp circuit is connected across the lower section of the secondary winding.

18. The DC—DC converter of claim 7 wherein the clamp circuit is connected between the first and second terminals of the secondary winding.

* * * * *

UNITED STATES PATENT AND TRADEMARK OFFICE
CERTIFICATE OF CORRECTION

PATENT NO. : 5,636,107
DATED : June 3, 1997
INVENTOR(S) : Qun Lu, Fei Ma, James J. Zeng It is certified that error appears in the above-identified patent and that said Letters Patent is hereby corrected as shown below:

Item [56] References Cited - U.S. Patent Documents,
"5,303,136" should be -- 5,303,138 --.

Column 5,
Line 28, "$0.3333V_{inmin}$" should be -- $0.333V_{inmax}$ --.
Line 32, "$V_{inmin}$" should be -- $V_{inmax}$ --.

Signed and Sealed this

Sixth Day of November, 2001

*Attest:*

NICHOLAS P. GODICI
*Attesting Officer                Acting Director of the United States Patent and Trademark Office*